United States Patent
Maskatia et al.

(10) Patent No.: US 12,167,104 B2
(45) Date of Patent: *Dec. 10, 2024

(54) SYSTEM AND METHOD FOR DELIVERING EMERGENCY ALERTS

(71) Applicant: Gray Media Group, Inc., Montgomery, AL (US)

(72) Inventors: Imran Arif Maskatia, Palo Alto, CA (US); Benjamin James Kauffman, Ridgefield, WA (US); Thomas Lee Rich, Meridian, ID (US); Nicholas James Hottinger, Boise, ID (US); Michael J. Chase, Jr., New Boston, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,188

(22) Filed: Sep. 17, 2023

(65) Prior Publication Data

US 2024/0276073 A1     Aug. 15, 2024

Related U.S. Application Data

(63) Continuation of application No. 17/508,215, filed on Oct. 22, 2021, now Pat. No. 11,765,440.

(51) Int. Cl.
*H04N 21/81* (2011.01)
*H04N 21/236* (2011.01)
*H04N 21/488* (2011.01)

(52) U.S. Cl.
CPC ..... *H04N 21/814* (2013.01); *H04N 21/23614* (2013.01); *H04N 21/4882* (2013.01)

(58) Field of Classification Search
CPC ............. H04N 21/814; H04N 21/4882; H04N 21/235; H04N 21/435; H04N 21/2362
See application file for complete search history.

(56) References Cited

U.S. PATENT DOCUMENTS

| | | | |
|---|---|---|---|
| 7,716,662 | B2 | 5/2010 | Seiden |
| 8,745,655 | B2 | 6/2014 | Reddy |
| 9,154,854 | B1 | 10/2015 | Straub |
| 11,765,440 | B1 * | 9/2023 | Maskatia ............. H04N 21/814 725/33 |
| 2003/0200548 | A1 | 10/2003 | Baran |
| 2007/0136743 | A1 | 6/2007 | Hasek |
| 2008/0120639 | A1 | 5/2008 | Walter |
| 2008/0120645 | A1 | 5/2008 | Yun |
| 2010/0211970 | A1 | 8/2010 | Howarter |
| 2011/0095881 | A1 | 4/2011 | Rosentel |

(Continued)

*Primary Examiner* — Jason Salce
(74) *Attorney, Agent, or Firm* — Krishna Kalidindi (57) ABSTRACT

A method of communicating an emergency alert includes receiving, by a central content controller (CCC), audiovisual (AV) content from a plurality of sources, determining existence of one or more emergency alerts, encoding the content to form a first stream type and transmitting the first stream type to regional controllers (RCs) associated with a respective market area (MA) if no alerts exist, determining, if an alert exist, a market area for the alert, encode the content and the alert to form a second stream type, transmit the second stream type to a RC associated with a MA for which the alert is applicable and encode the content to form the first stream and transmit the first stream type to RCs associated with a MA without an alert, and broadcast, as AV signals, the received stream types by the RC.

4 Claims, 4 Drawing Sheets

(56) References Cited

U.S. PATENT DOCUMENTS

| | | |
|---|---|---|
| 2011/0197223 A1 | 8/2011 | Ravula |
| 2012/0126976 A1 | 5/2012 | Bugenhagen |
| 2013/0247094 A1 | 9/2013 | Hardin |
| 2014/0075472 A1 | 3/2014 | Mitsuya |
| 2015/0256902 A1 | 9/2015 | Fusco |
| 2018/0041891 A1 | 2/2018 | Bleyl |
| 2019/0174204 A1 | 6/2019 | Deshpande |
| 2020/0074839 A1 | 3/2020 | Trigg |
| 2020/0119847 A1 | 4/2020 | Fay |

* cited by examiner

SYSTEM AND METHOD FOR DELIVERING EMERGENCY ALERTS

BACKGROUND

This disclosure is directed to communication of emergency alerts. The use of Emergency Alert System (EAS) to communicate alerts is known. EAS replaced the Emergency Broadcast System (EBS) in 1997. EAS is designed to provide authorized officials the ability to communicate emergency alerts and warning messages to the public. These messages can be communicated via a broadcast antenna over the air (OTA) or by satellite to radio and television receivers.

A recently adopted television standard, ATSC 3.0 (Advanced Television Systems Committee) provides for the broadcast (over the air, OTA) of television signals an internet protocol (IP) format which is the format in which data is communicated over a broadband and/or internet connection.

OTA interface is a traditional communication path for broadcasting to all receivers within a physical viewing or receiving range. Transmission over a broadband (or network), on the other hand, can take place via unicast (one destination) or multicast (multiple destinations).

While EAS was designed to provide the President the ability to address the country in a national emergency via all radio and television stations, it has been used almost exclusively to communicate severe weather alerts such as tornadoes, flash floods, hurricanes, wildfires and AMBER alerts.

The EAS alerts can originate from local, state, or federal alerting authorities. The messages can be delivered as radio frequency (RF) signals such as AM/FM. The messages can also be delivered over the internet or via television (TV) broadcast stations. The alert can include a header, an audio signal, an audio message, a textual representation of the message an alert end signal (as well as various other metadata related to the alert).

In some systems, AV content may be encoded at a central location and communicated to local or regional areas for broadcast transmission. In these systems, a dedicated encoder is needed to encode EAS information at each broadcast transmission site for broadcast over the air (OTA).

Example embodiments of the present disclosure provides a more efficient, effective and reliable method for communicating alerts.

The terms "user", "viewer", "customer" and "consumer" are used interchangeably within this disclosure. A "viewer" and "viewer premises are also used interchangeably. The terms "AV signals", "AV content", "AV program", "data files" and "broadcast content" are also used interchangeably. The terms "communicated", "transmitted" and "submitted" are all used interchangeable to indicate the sending of data. The terms "existing" and "active" are also used interchangeably in referring to an alert.

SUMMARY

According to an example embodiment, a method of communicating an emergency alert is disclosed. The method comprises: receiving, by a central content controller (CCC), audiovisual (AV) content from a plurality of sources; and determining existence of one or more emergency alerts. If no alerts exist, encoding the content to form a first stream type; and transmitting the first stream type to regional controllers (RCs) associated with a respective market area (MA). If an alert exists, determining a market area for each of the one or more emergency alerts; for each market area having an active alert: encoding the content and the alert to form a second stream type; and transmitting the second stream type to a RC associated with a MA for which the alert is applicable, for each MA without an applicable alert: encoding the content to form the first stream type; and transmitting the first stream type to RCs associated with a respective MA. The RC receiving the content: broadcasting, as AV signals, the received stream types to the MA.

According to another example embodiment, a system for communicating an emergency alert is disclosed. The system comprises a central content controller (CCC) and a plurality of regional controllers (RCs) each associated with a respective market area (MA). The CCC is configured to: receive audiovisual (AV) content from a plurality of sources; determine existence of one or more emergency alerts; and encode the content to form a first stream type and transmit the first stream type if no alerts exist. If an alert exists, the CCC is further configured to: determine a market area (MA) for each alert; encoded the content and alert to form a second stream type; and transmit the second stream type. For MAs without an alert, the CCC is also configured to encode the content to form the first stream type; and transmit the first stream type. Each RC is associated with a respective market area and is configured to: receive the stream types transmitted by the CCC; and broadcast, as AV signals, the received stream types.

According to a further example embodiment, a computer readable medium containing program instructions for communicating an emergency alert is disclosed. The execution of the program instructions by one or more processors of one or more computer systems causes the one or more processors to carry out the steps of: receiving audiovisual (AV) content from a plurality of sources; determining existence of one or more emergency alerts; if no alerts exist, encoding the content to form a first stream type; transmitting the first stream type to regional controllers (RCs) associated with a respective market area (MA), else, determining a market area for each of the one or more emergency alerts; for each market area having an active alert: encoding the content and the alert to form a second stream type; and transmitting the second stream type to a RC associated with a MA for which the alert is applicable, for each MA without an applicable alert: encoding the content to form the first stream type; and transmitting the first stream type to RCs associated with a respective MA, wherein the transmitted stream types is broadcast by the receiving RC as AV signals to the MA corresponding to the RC.

BRIEF DESCRIPTION OF THE DRAWINGS

The several features, objects, and advantages of example embodiments will be understood by reading this description in conjunction with the drawings. The same reference numbers in different drawings identify the same or similar elements. In the drawings.

DETAILED DESCRIPTION

In the following description, numerous specific details are given to provide a thorough understanding of embodiments.

The embodiments can be practiced without one or more of the specific details, or with other methods, components, materials, etc. In other instances, well-known structures, materials, or operations are not shown or described in detail to avoid obscuring aspects of the example embodiments.

Reference throughout this specification to an "example embodiment" or "example embodiments" means that a particular feature, structure, or characteristic as described is included in at least one embodiment. Thus, the appearances of these terms and similar phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

According to example embodiments, methods and systems are disclosed for communicating EAS information without a dedicated encoder. Furthermore, alerts that are applicable to viewers in particular geographic, broadcast or market area are communicated to those viewers from a location that is remote from (or, outside) the market area associated with the viewer.

A system in accordance with example embodiments may be described with reference to FIG. 1. System 100 may comprise a central content controller (CCC) 101. Viewers may be located in a plurality of market areas (MAs). A market area can be a broadcast coverage area or a geographic area. The physical size of a market area can vary from a few square miles to as much as over one hundred square miles. A MA can be a contiguous geographic area for example. In system 100 of FIG. 1, four such market areas 110, 120, 130 and 140 are illustrated. While four MAs are illustrated, this number is an example and the actual number of MAs can be higher or lower.

Each market area may have a regional controller (RC) associated therewith. RC1 (112) can be associated with MA1 (110), RC2 (122) can be associated with MA2 (120), RC3 (132) can be associated with MA3 (130) and RCn (142) can be associated with MAn (140).

Audio visual (AV) content 102 from a plurality of sources may be received at CCC 101. The source of the content may be a national network, etc. The content may be received by CCC 101 over dedicated terrestrial or satellite networks or over the Internet 150. The received content may be encoded by encoder 104 of CCC 101.

Content encoder 104 may encode the received content 102 into an IP delivery form using a particular codec such as MPEG-2 or H.265 for example. The encoded content can be packetized and encrypted. In can also be packaged using MPEG Dash or HLS or MP4 for example.

The encoded content may be communicated (as a data or video stream for example) by CCC 101 to one or more of a plurality of regional controllers (RCs) 112, 122, 132 and 142 (associated with market areas 110, 120, 130 and 140) over a corresponding communication medium or link 108-1, 108-2, 108-3 and 108-4. The communication medium can be a private network such as a VPN that can either be a terrestrial or a satellite link. The type of links (108-1, etc.) can differ between CCC 101 and the various destination RCs or over time.

A RC can have an antenna associated therewith for broadcasting the received encoded stream (content) as AV signals over the air (OTA) to viewers in the correspond market area (MA). That is, RC1 (112) can be associated with antenna 114, RC2 (122) can be associated with antenna 124, RC3 (132) can be associated with antennal 134 and RCn (142) can be associated with antenna 144.

The AV signals broadcast by the antenna can be received by viewers within reception range of the AV signals. In MA1 (110) for example, RC1 (112) broadcasts AV signals via broadcast antenna 114. Viewers 116-1, 116-2 and 116-3 within MA1 (110) can receive the AV signals broadcast by antenna 114.

A viewer 116 may receive the AV signals via an antenna 118 associated with the viewer premises for example. That is, antenna 118-1 can be associated with viewer 116-1, antenna 118-2 can be associated with viewer 116-2 and antenna 118-3 can be associated with viewer 116-3.

The received antenna signals can be received and decoded and processed for presentation to a viewer by a set-top-box (STB) such as STB 119. A viewer and associated STB can be associated with a viewer premises such as a home or an office, etc. That is, STB 119-1 can be associated with viewer 116-1 and antenna 118-1, STB 119-2 can be associated with viewer 116-2 and antenna 118-2 and STB 119-3 can be associated with viewer 116-3 and antenna 118-3.

In MA2 (120), RC2 (122) can broadcast AV signals via broadcast antenna 124 for reception by viewer 126 via antenna 128 and decoding by STB 129. A similar arrangement is illustrated for the remaining market areas such as MA3 and MAn.

For illustrative purposes, three viewers 116-1, 116-2 and 116-3 are shown as being located in MA1 (110) and within a reception range of broadcast antenna 114 of RC1 (112). One viewer (126, 136 and 146) is illustrated as being located in each of MA2 (120), MA3 (130) and MAn (140). However, the number of viewers within a MA is typically much higher. In some scenarios, a viewer can receive broadcast signals from multiple MAs due the viewer being located in a physical area where broadcast AV signals from adjacent MAs can overlap.

A viewer (116-1, 116-2, 116-3, 126, 136 and 146) within system 100 utilizing an associated STB can also be connected via a broadband connection (115-1, 115-2, 115-3, 125, 135 and 145) to CCC 101 over the Internet or the cloud 150. CCC 101 may be connected to the Internet 150 via a communication link 155.

The encoded content received by the RCs may be broadcast to viewers (or viewer premises) within the associated market area (MA) in the manner described above. A RC can receive signals from CCC that can include, for example, television programming for a plurality of channels.

In order to transmit EAS alerts in existing systems, the RC (that may receive an alert) is required to maintain an encoder for each channel of programming that is broadcast via the (RC's) associated antenna. Example embodiments obviate this need for dedicated encoders by processing and routing the alerts at a central location (such as at CCC 101).

Under ATSC 3.0, television signals may be broadcast in an internet protocol (IP) format. The IP format is a format that is also used for communicating data over a broadband and/or internet connection.

Figure 1:
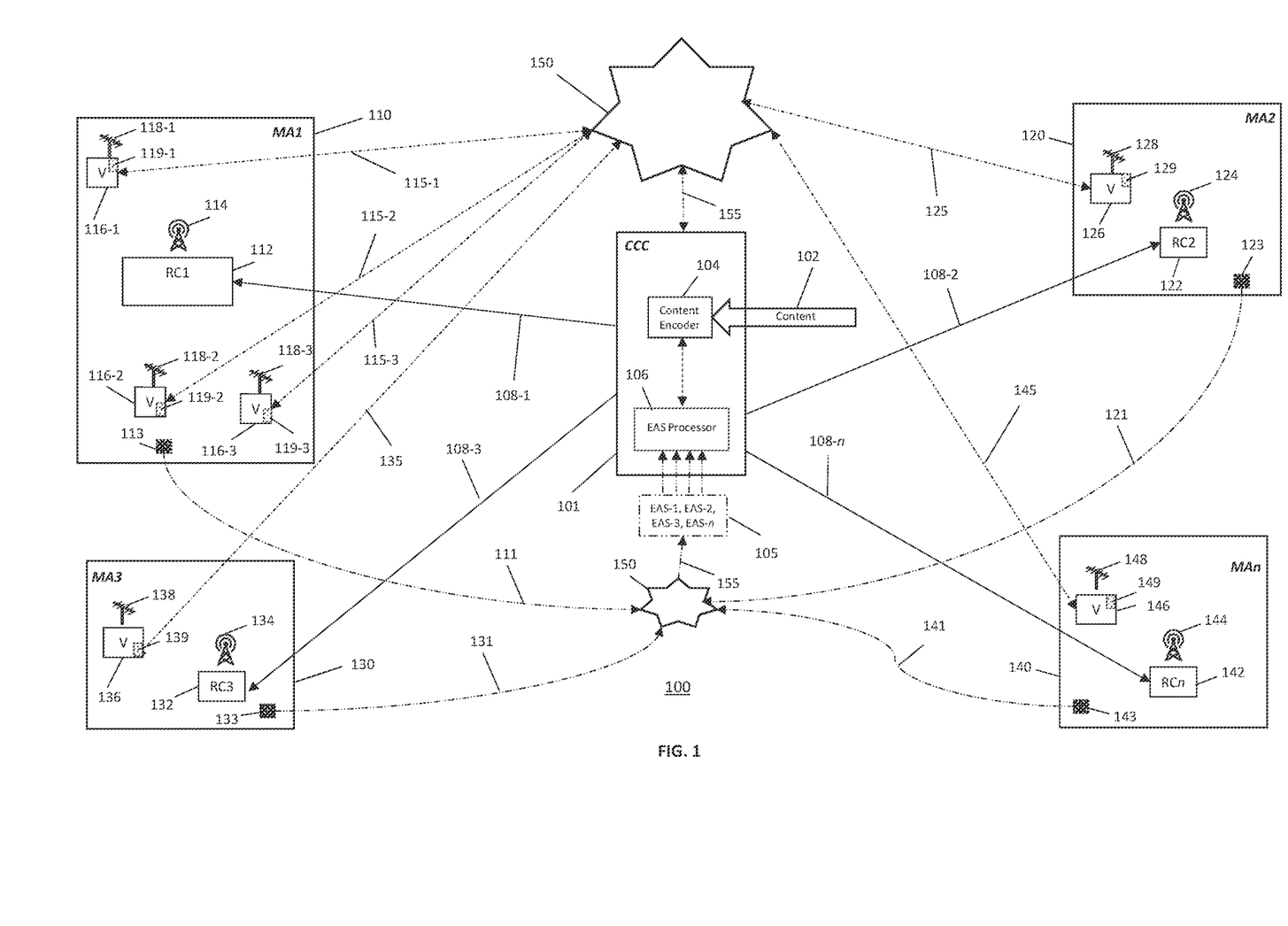
FIG. 1 illustrates a system according to example embodiments.

Referring to FIG. 1, in addition to receiving content 102, CCC 101 may also be configured to receive EAS alerts 105. Such alerts may be received from a plurality of MAs such as MA1-MAn.

Alerts generated by the various entities/authorities may be "gathered" by an EAS alert receiver and provide a single source of alerts to down stream systems. One such receiver is a DASDEC™ device from Digital Alert Systems, Inc. of Lyndonville, NY.

The alerts may be in the form of text files (such as in .xml format) and an audio stream. The receiver may normalize the alert data that can be received in different formats. The receiver can provide the alert data as textual metadata and an audio stream. The metadata can include federal information processing (FIPS) codes which provide a level of granularity to a county or sub-county level in which an alert may be applicable.

In example embodiments, such a receiver can be configured to communicate the alerts to the CCC via an internet connection. A receiver, such as receiver 113 of MA1 (110), can communicate any alerts for MA1 to CCC 101 via a communication link 111 over the Internet 150. Similarly, devices 123 of MA2, 133 of MA3 and 143 of MA2 can communicate any alerts for the respective MAs to CCC 101 via the respective communication links 121, 131 and 141 over the Internet 150. CCC 101 may be connected to the Internet 150 via a communication link 155.

In FIG. 1, Internet 150 and communication link 155 are shown in duplicate (above and below CCC 101) to reduce clutter in the illustration.

An EAS alert received from a MA may be processed by EAS processor 106 of CCC 101. The MA to which the received EAS alert is applicable may be determined.

If an alert is received, the CCC may determine the MA for which the alert is applicable. The CCC may then encode (and/or packetize and/or encrypt) the content and the alert into a stream that is communicated to the RC associated with the MA for which the alert is applicable.

Content encoder 104 within CCC 101 may check with EAS processor 106 of CCC 101 to determine if an EAS alert is in effect.

The functionality described above (content encoding/converting, EAS processing for example) can be performed by a processor associated with CCC 101.

A method in accordance with example embodiments may be illustrated with reference to FIG. 2. In method 200, the CCC (such as CCC 101 of FIG. 1) may receive AV content from a plurality of sources at 210.

A determination may be made at 220 as to whether any alerts have been received (i.e. whether any active alerts exist). If no alerts are active, the AV content may be encoded to form a first stream type at 230. The first stream type may be encoded AV content.

If any active alerts exist (i.e. at least one alert), a determination may be made at 250 as to how many alerts exist and the market areas (MAs) to which the alerts are applicable.

Upon this determination, the AV content and the applicable alert for each MA may be encoded to form a second stream type at 260. For MAs without an active alert, the content may be encoded to form the first stream type also at 260. The second stream type may be encoded AV content and a corresponding alert.

The first stream type formed at 230 may be transmitted (as a data/video/AV stream) by the CCC to RCs at 240. The first and/or second stream types formed at 260 may also be transmitted by the CCC to RCs at 240. Each RC, upon receipt of the stream, may broadcast the received stream as AV signals over the air (OTA) at 270.

In system 100 of FIG. 1 for example, an alert may be received by CCC 101 from device 113 of MA1 (110) via network links 111, 150 and 155. In this example, no other alerts (from other MAs) are received by CCC 101. CCC 101 may transmit the first stream type (encoded content) to RC2, RC3 and RCn as the alert is not applicable to MA2, MA3 and MAn.

Since the alert is applicable only for MA1, CCC 101 may transmit the second stream type (encoded content and alert) to RC1.

Figure 2:
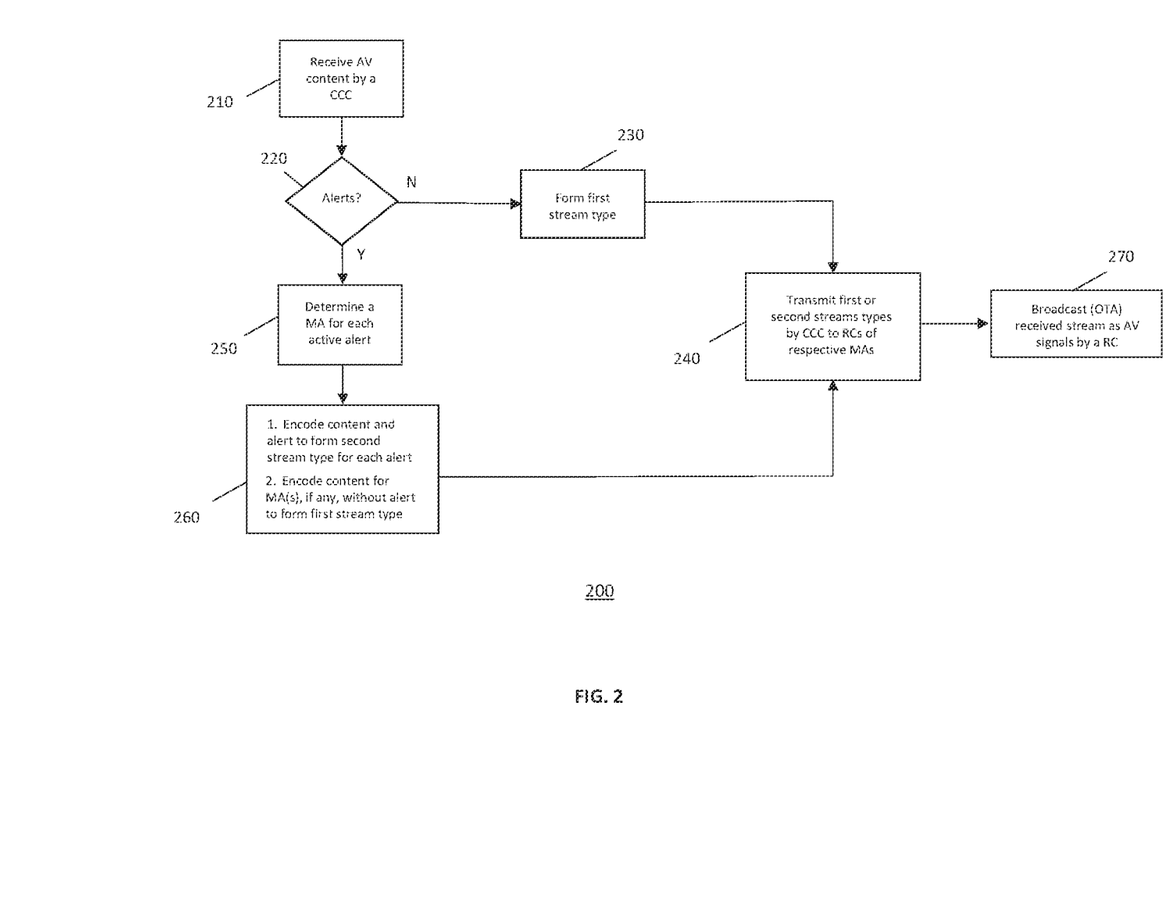
FIG. 2 illustrates a method according to example embodiments.

Method 200 of FIG. 2 may follow the "Y" path if at least one alert is active. If, subsequently, the previous alert is no longer active (the period or timeframe of the alert has expired for example), the method may switch to the "N" path. Conversely, the method may follow the "N" if no alerts are active and subsequently, if an alert becomes active, the method may switch to the "Y" path.

For market areas with an alert, the second stream type (encoded content and alert) is formed. For MAs without an alert, the first stream type (encoded) content is formed.

Encoded content communicated by CCC 101 to each of the RCs 112, 122, 132 and 142 may be in the form of a stream of IP packets. The IP packets may be converted to RF signals by the RCs for broadcast within the corresponding MA.

If a stream received by a RC is a second stream type (encoded content and alert), the RC does not need to utilize a separate encoder at its (i.e. RC1 of MA1 in the example described above) broadcast antenna location. The alerts may then be communicated (i.e. displayed) in a known manner—by a sequence of an audio signal, audio message and an end alert signal for example.

Each of RCs 112, 122, 132 and 142 may broadcast content that is specific to the associated MA (110, 120, 130 and 140 for example). Such "local" content may be from channels or sources specific to the MA. As an example, RC 112 may correspond to a MA associated with Boise, ID and may broadcast AV signals for programming that is specific to Boise such as news, weather, sports, school information, traffic, etc. RC 142 may correspond to a DMA associated with Portland, OR and may broadcast AV signals for programming that is specific to Portland.

The "local" programming may be in addition to national programming such as national news, national sporting events, scheduled network programming or other similar programming.

Figure 3:
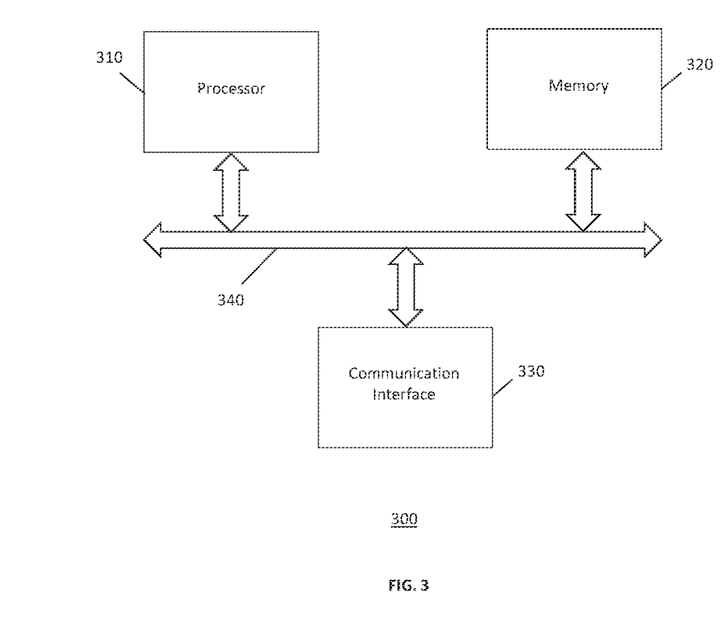
FIG. 3 illustrates a central content controller according to example embodiments.

A central content controller (CCC) in accordance with example embodiments is illustrated in FIG. 3. CCC 300 may include, but is not limited to, a processor 310, a memory 320, a communication interface 330 and a system bus 340 for interconnecting each of these components in a known manner. CCC 300 can be a general purpose computing device. A processor or memory can also refer to a plurality of processors or memory devices.

Processor 310 may incorporate the functionality of content encoder 104 and EAS processor 106 of FIG. 1 for example. It may also check for existence of alerts as described above with respect to step 220, the determining of MAs associated with alerts at step 250 and the encoding at steps 230 and 260 of FIG. 2.

Interface 330 may provide communication between CCC 300 (or CCC 101 of FIG. 1) and the plurality of RCs 112, 122, 132 and 142 in their respective MAs 110, 120, 130 and 140 via paths 108-1, 108-2, 108-3 and 108-4 for example. The paths may be dedicated private network(s) for example.

Interface 330 may also facilitate communication between the CCC 101 and each of STBs 119-1, 119-2, 119-3, 129, 139 and 149 (of FIG. 1) via the Internet 150. Interface 330 can also facilitate reception by CCC 101 of the alerts (EAS-1, EAS-2, EAS-3 and EAS-4 for example) via paths 111, 121, 131 and 141. Interface 330 may facilitate communication between CCC 101 and the RCs.

CCC 300 may have AV content stored within memory 320. Memory 320 may also store any other information necessary for facilitating the functionality of CCC 101. This may include information received from the STBs, routing information to communicate with RCs, instructions for encoding content and alerts for example.

A RC (not specifically illustrated) can also comprise a processor, a memory, a communication interface and a bus interconnecting these components as described with reference to a CCC. Utilizing these components, the RC can receive content from CCC and broadcast the content over the air (OTA).

Figure 4:
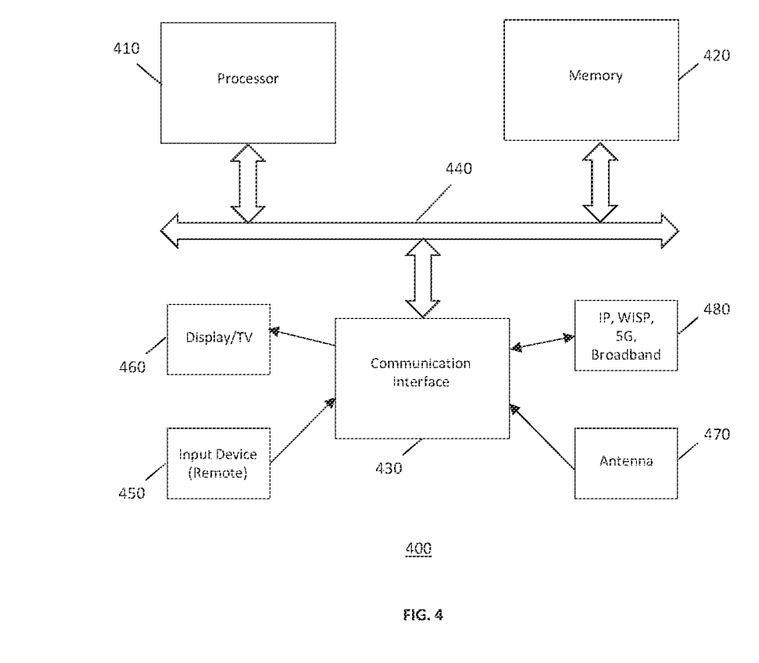
FIG. 4 illustrates a set-top-box (STB) according to example embodiments.

An example device associated with a viewer such a set-top-box (STB) in accordance with example embodiments is illustrated in FIG. 4. STB 400 (labeled as 119-1, 119-2, 119-3, 129, 139 and 149 in FIG. 1) may include, but is not limited to, a processor 410, a memory 420, a communication interface 430 and a system bus 440 for interconnecting each of these components in a known manner.

Communication interface 430 may receive viewer inputs via a remote control or a keyboard or other such input device 450. Interface 430 may receive data signals via an antenna 470 (if signal is broadcast/broadcast multicast for example) or over an ISP gateway/modem 480.

Interface 430 may also provide communication with a display or monitor (e.g. TV) 460 for displaying AV content. The display may have audio output for playing the audio component of an AV file. Interface 430 may also communicate data with CCC 101 of FIG. 1. The data may include viewer input. Memory 420 may store the received AV signals viewing at a time chosen by the viewer.

The STB could be any reception device. It need not be limited to a typical hardware device as highlighted above. It can be any device (or software) that comprises, but not be limited to, a processor, storage, internet connection and broadcast reception. It can be a mobile phone, a tablet, a laptop, a desktop or the like. It can be an app running on any of these devices. Each of those components (or software modules) may be in a single device or in multiple devices (such as network-attached storage, etc.).

Processor 410 may process the signals received via antenna 470 for presentation on display 460, various inputs from a user/viewer input device 450 and the alerts received from CCC 101.

Features and functionality associated with example methods and systems as described above may be implemented via software instructions executing on one or more processors of one or more general purpose computing devices or computing systems for example. By processing active alerts using processing resources at a central location, example embodiments obviate the need for having separate, dedicated encoders at the broadcast location (i.e. at each of the RCs 112, 122, 132 and 142 in system 100 of FIG. 1).

Since an alert is processed at the central location, processing resources at the central location may be reused in the sense that they can be used for alerts from different market areas at different times. For example, if an alert is active for MA1 but not for other MAs, there exists no need for dedicating resources for other MAs. Subsequently, if MA1 is not active and MA3 is active, the resources can be "switched" to processing the alert for MA3. If no alerts are active, the resources can be made available for other purposes. The processing resources may thus be used on a "just-in-time" or on an "as needed" basis. Such efficiency in terms of reuse for example reduces costs.

Although example embodiments have been disclosed, it will be apparent to those skilled in the art that various changes and modifications can be made which will achieve some of the advantages of embodiments without departing from the spirit and scope of the disclosure. Such modifications are intended to be covered by the appended claims.

Further, in the description and the appended claims the meaning of "comprising" is not to be understood as excluding other elements or steps. Further, "a" or "an" does not exclude a plurality, and a single unit may fulfill the functions of several means recited in the claims.

The above description of illustrated embodiments and what is described in the Abstract below, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in relevant art.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A computing device comprising:

a processor;

a memory;

a communication interface; and a system bus interconnecting the processor, the memory and the communication interface, wherein:

the communication interface is configured to receive audiovisual (AV) content from a plurality of sources;

the processor is configured to:

determine the existence of one or more emergency alerts;

if no alerts exist:

encode the received AV content to form a first stream type;

else, determine a market area (MA) for an existing alert;

for each MA having an alert:

encode the received AV content and the alert to form a second stream type;

for each MA not having an alert:

encode the received AV content to form the first stream type;

wherein further the communication interface is configured to:

transmit the first stream type to regional controllers (RCs) associated with a respective market area (MA); and transmit the second stream type to a RC associated with a MA for which the alert is applicable, the RC broadcasting, via an over the air (OTA) interface, the received stream types as AV signals to the MA associated with the RC.

2. The computing device of claim 1, wherein the communication interface is further configured to:
receive an alert from an alert generator.

3. The computing device of claim 2, wherein the alert generator is communicatively coupled to the computing device via a private or a public network.

4. A central content controller (CCC) comprising:
a computing device configured to:
receive audiovisual (AV) content from a plurality of sources via a communication interface of the device;
determine existence of one or more emergency alerts by a processor of the device;
if no alerts exist,
encode, by the processor, the content to form a first stream type; and
transmit, via the communication interface, the first stream type, else,
determine, by the processor, a market area (MA) for the one or more emergency alerts;
for a MA having an active alert:
encode, by the processor, the content and the alert to form a second stream type; and
transmit, via the communication interface, the second stream type,
for a MA without an applicable alert:
encode, by the processor, the content to form the first stream type; and
transmit, via the communication interface, the first stream type, wherein the first and second stream types are transmitted to a plurality of regional controllers (RC) associated with respective MAs, the RCs being configured to:
receive the stream types transmitted by the CCC; and
broadcast, via an over the air (OTA) interface, the received stream types as AV signals to the MA associated with the RC.

* * * * *